US012525717B2

(12) United States Patent
Chen et al.

(10) Patent No.: US 12,525,717 B2
(45) Date of Patent: Jan. 13, 2026

(54) CIRCULAR POLARIZED ANTENNA ARRAY MODULE AND WIRELESS COMMUNICATION DEVICE

(71) Applicant: Chiun Mai Communication Systems, Inc., New Taipei (TW)

(72) Inventors: Cheng-An Chen, New Taipei (TW); Chia-Hung Su, New Taipei (TW); Chang-Ching Huang, New Taipei (TW); Lung-Ta Chang, New Taipei (TW); Shu-Wei Jhang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 169 days.

(21) Appl. No.: 18/239,651

(22) Filed: Aug. 29, 2023

(65) Prior Publication Data

US 2024/0186704 A1 Jun. 6, 2024

(30) Foreign Application Priority Data

Dec. 2, 2022 (CN) ........................ 202211542996.X

(51) Int. Cl.
*H01Q 21/24* (2006.01)
*H01Q 9/04* (2006.01)

(52) U.S. Cl.
CPC ........... *H01Q 9/0435* (2013.01); *H01Q 21/24* (2013.01)

(58) Field of Classification Search
CPC ............................. H01Q 9/0435; H01Q 21/24
See application file for complete search history.

(56) References Cited

U.S. PATENT DOCUMENTS

| | | | | |
|---|---|---|---|---|
| 11,515,993 | B1 * | 11/2022 | Reda | H04L 5/14 |
| 2011/0109507 | A1 | 5/2011 | Warnick | |
| 2018/0069605 | A1 | 3/2018 | Gharavi et al. | |
| 2019/0140362 | A1 | 5/2019 | Edenfield et al. | |
| 2019/0190165 | A1 | 6/2019 | Biancotto et al. | |

FOREIGN PATENT DOCUMENTS

| | | | |
|---|---|---|---|
| CN | 111381213 | A | 7/2020 |
| CN | 114300867 | A | 4/2022 |
| CN | 114902581 | A | 8/2022 |
| CN | 115051152 | A | 9/2022 |
| CN | 115313066 | A | 11/2022 |

* cited by examiner

*Primary Examiner* — Henry Luong
(74) *Attorney, Agent, or Firm* — ScienBiziP, P.C.

(57) ABSTRACT

A circular polarized antenna array module and a wireless communication device, including a plurality of circular polarized transmitting antennas and circular polarized receiving antennas, a dielectric substrate, and a plurality of first group of phase shifting units and second group of phase shifting units. In each row of the circular polarized transmitting/receiving antennas, every two adjacent circular polarized transmitting/receiving antennas arranged with a distance, each of the circular polarized transmitting antennas arranged with a first feed point and a second feed point, each of the circular polarized receiving antennas arranged with a third feed point and a fourth feed point. Each row of the circular polarized transmitting antennas and each row of the circular polarized receiving antennas alternately placed to form array arranged on the dielectric substrate. The first/second group of phase shifting units adjust phases of transmitting signals/return signals of the circular polarized transmitting/receiving antennas.

18 Claims, 17 Drawing Sheets

Phase shifted 120 °

Phase shifted 90 °

Phase shifted 60 °

Phase shifted 30 °

Phase shifted 0 °

CIRCULAR POLARIZED ANTENNA ARRAY MODULE AND WIRELESS COMMUNICATION DEVICE

CROSS-REFERENCE TO RELATED APPLICATIONS

This application claims priority to Chinese Patent Application No. 202211542996.X filed on Dec. 2, 2022, in China National Intellectual Property Administration, the contents of which are incorporated by reference herein.

FIELD

The subject matter herein generally relates to wireless communication, and more particularly to a circular polarized antenna array module and a wireless communication device having the same.

BACKGROUND

Low-orbit satellite system (LEO) is a large satellite system composed of multiple satellites that can process real-time information. Low-orbit satellites are also used for communication of mobile terminals such as mobile phones. Due to the low altitude of the orbit, mobile terminals using low-orbit satellite communication have the advantages of short transmission delay and low path loss. A mobile communication system composed of multiple low-orbit satellites can achieve global coverage, and frequency reuse is more effective. Technologies such as cellular communication, multiple access, spot beam, and frequency reuse also provide technical support for the low-orbit satellites in mobile communications. Low-orbit satellites are highly promising mobile communication systems at present.

However, in order to reduce the complexity of antenna design and reduce the interference between the transmitting antenna and the receiving antenna, the present antenna array modules used in low-orbit satellites generally arrange the transmitting antenna and the receiving antenna in different areas. In this way, the overall area of the antenna array module becomes relatively large, which is not conducive to the application of the antenna array module to mobile terminals.

BRIEF DESCRIPTION OF THE DRAWINGS

Implementations of the present disclosure will now be described, by way of embodiments, with reference to the attached figures.

DETAILED DESCRIPTION

Figure 1:
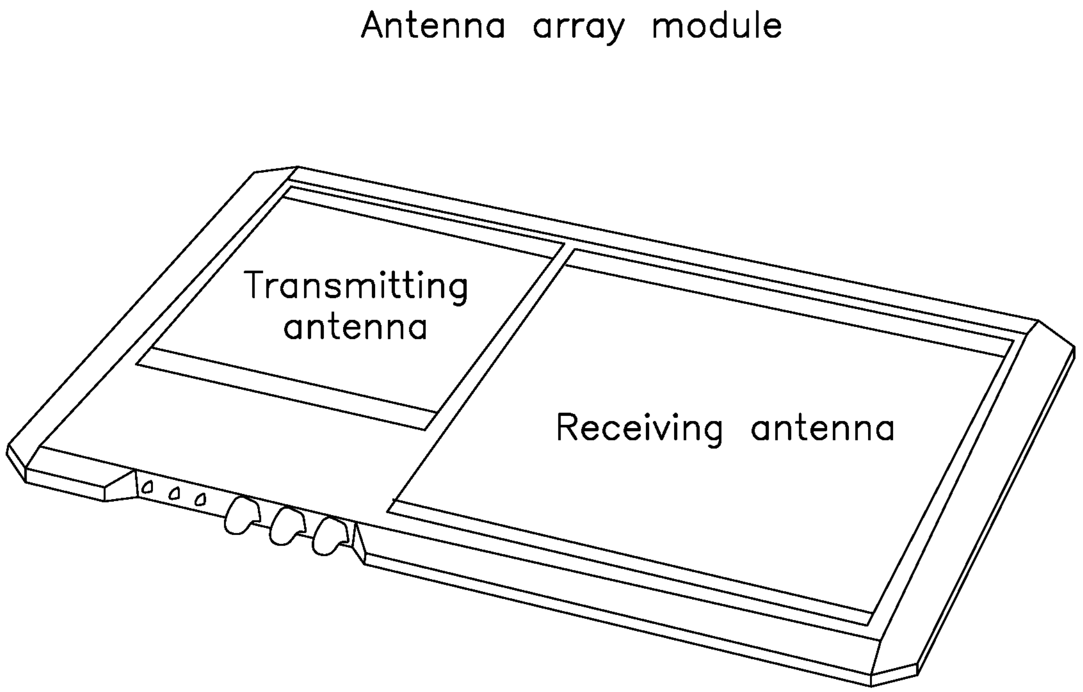
FIG. 1 is a schematic diagram of a present antenna array module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Low-orbit satellite system (LEO) is a large satellite system composed of multiple satellites that can process real-time information. Low-orbit satellites are also used for communication of mobile terminals such as mobile phones, and due to the low altitude of the orbit, mobile terminals using low-orbit satellite communication have the advantages of short transmission delay and low path loss. A mobile communication system composed of multiple low-orbit satellites can achieve global coverage, and frequency reuse is more effective. Technologies such as cellular communication, multiple access, spot beam, and frequency reuse also provide technical support for the low-orbit satellites in mobile communications. In a word, low-orbit satellites are highly promising mobile communication systems at present.

However, in order to reduce the complexity of antenna design and reduce the interference between the transmitting antenna and the receiving antenna, the present antenna array modules used in low-orbit satellites generally arrange the transmitting antenna and the receiving antenna in different areas (as shown in FIG. 1). In this way, the overall area of the antenna array module will be relatively large, which is not conducive to the application of the antenna array module to mobile terminals.

Figure 2:
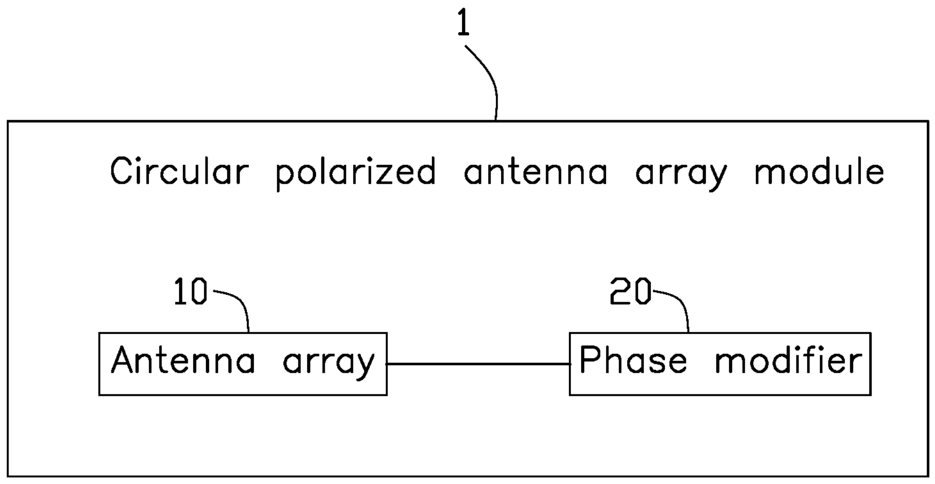
FIG. 2 is a block diagram of a circular polarized antenna array module according to at least one embodiment of the present disclosure.

FIG. 2 shows at least one embodiment of a circular polarized antenna array module 1 including an antenna array 10 and a phase modifier 20. The circular polarized antenna array module 1 can be applied to a wireless communication device (not shown), to execute wireless communication of the wireless communication device based on the low-orbit satellite. The antenna array 10 is configured to transmit and receive wireless signals for executing wireless communication. The phase modifier 20 is electrically connected to the antenna array 10 and configured to adjust phases of transmitting signals and receiving signals of the antenna array 10, to achieve high effective communication among portable wireless communication devices through beam-forming technology.

Figure 3:
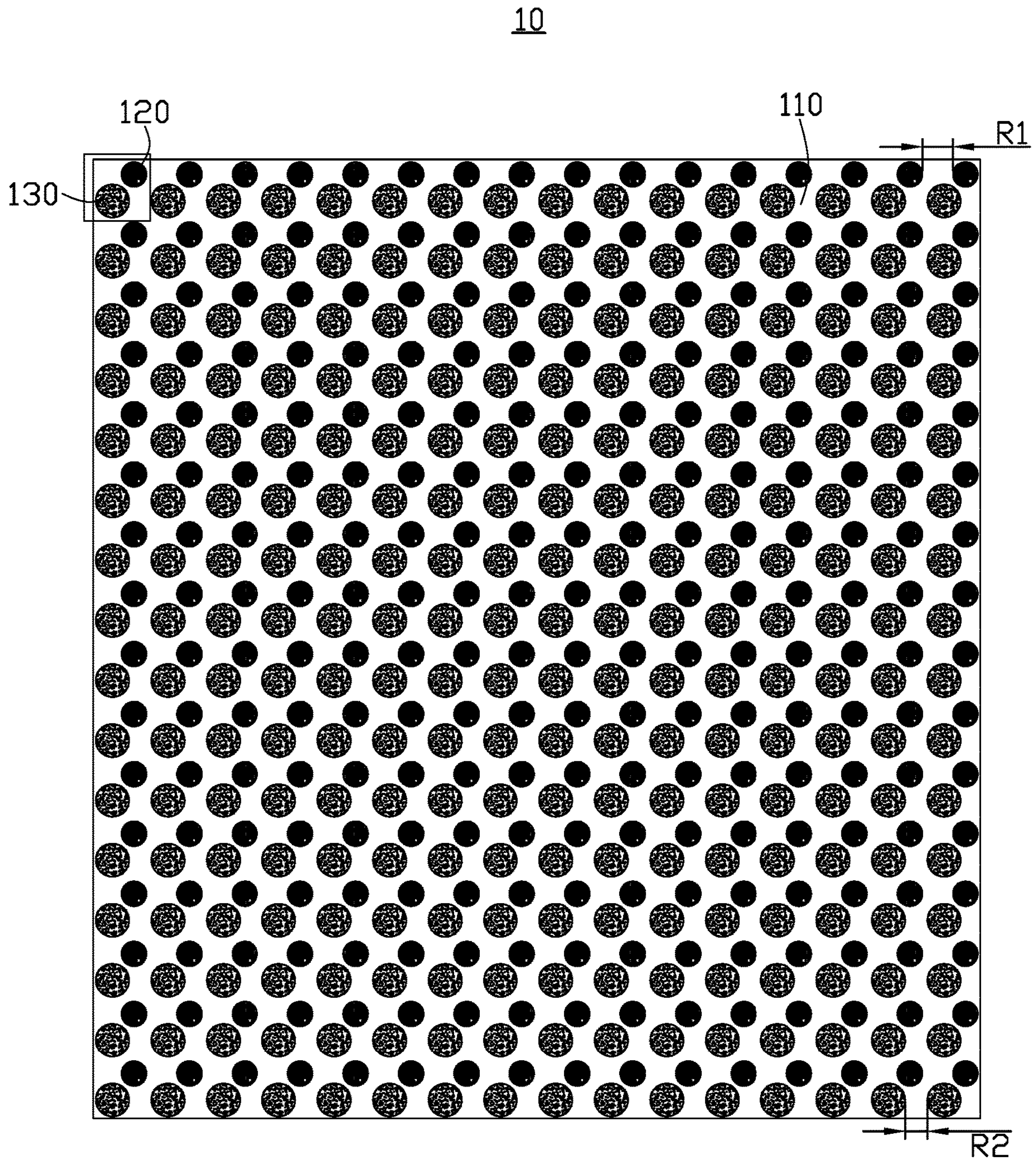
FIG. 3 is a distribution diagram of circular polarized transmitting antennas and circular polarized receiving antennas of the antenna array shown in FIG. 1.

Referring to FIG. 3, in at least one embodiment, the antenna array 10 includes a dielectric substrate 110, a plurality of circular polarized transmitting antennas 120, and a plurality of circular polarized receiving antennas 130.

In each row of the circular polarized transmitting antennas 120, every two adjacent circular polarized transmitting antennas 120 are arranged with a first predetermined distance R1. In each row of the circular polarized receiving antennas 130, every two adjacent circular polarized receiving antennas 130 are arranged with a second predetermined distance R2. Each circular polarized receiving antenna 130 is placed alternately between two circular polarized transmitting antennas 120. Sizes of the first predetermined distance R1 and the second predetermined distance R2 are not limited by the present disclosure. For instance, in an embodiment, the first predetermined distance R1 may be greater than the second predetermined distance R2. In another embodiment, the first predetermined distance R1 may be smaller than the second predetermined distance R2. Sizes of the first predetermined distance R1 and the second predetermined distance R2 may be adjusted according to a size of the product or radiation frequency.

The misplacement arrangement of the circular polarized transmitting antennas 120 and the circular polarized receiving antennas 130 forms an array on the dielectric substrate 110. That is, in at least one embodiment, each row of the circular polarized transmitting antennas 120 and each row of the circular polarized receiving antennas 130 are alternately arranged on the dielectric substrate 110, so the circular polarized transmitting antennas 120 and the circular polarized receiving antennas 130 are alternately arranged on a same area of the dielectric substrate 110, which may decrease a usage area of the dielectric substrate 110 by 60% and improve a miniaturization of the antenna array 10.

Figure 4:
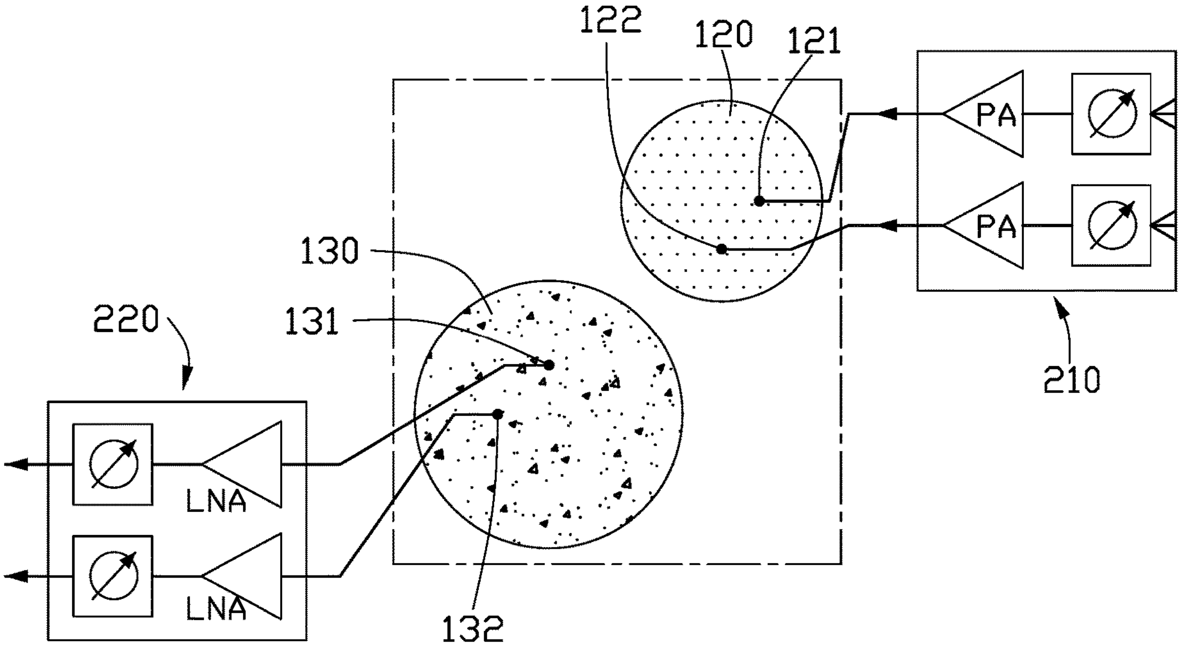
FIG. 4 is circuit diagrams of the circular polarized transmitting antennas and the circular polarized receiving antennas of FIG. 3 respectively connected to a first phase shifter and a second phase shifter.
Figure 5A:
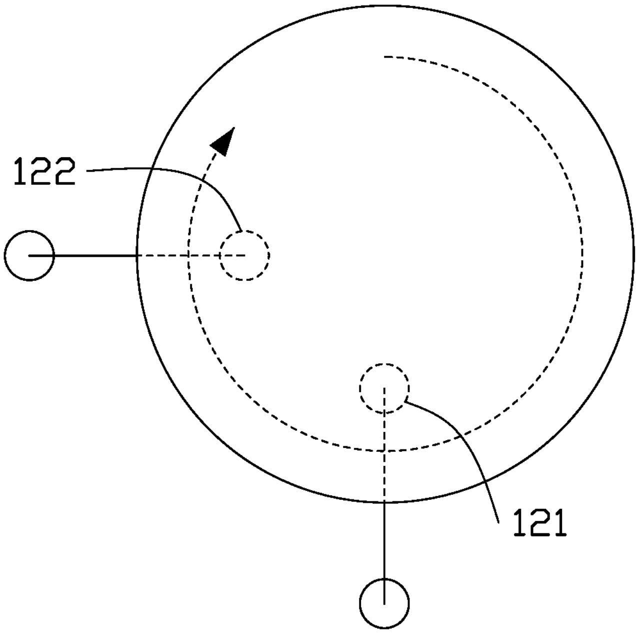
FIG. 5A is schematic diagram of a left-hand circular polarization.
Figure 5B:
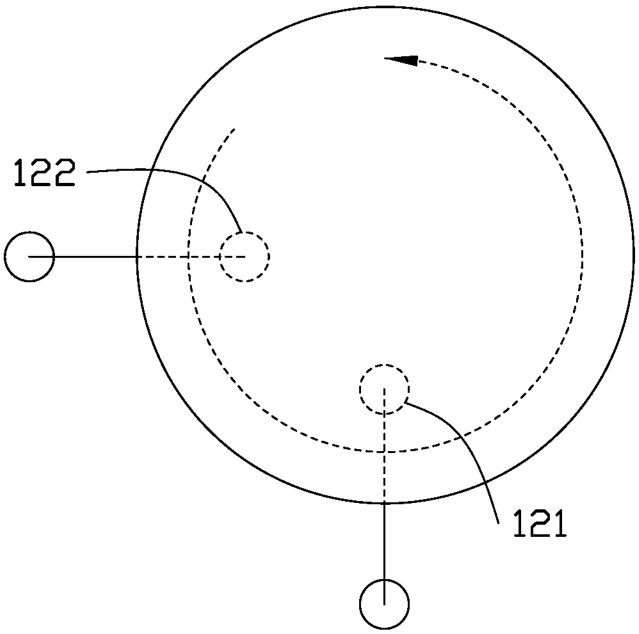
FIG. 5B is schematic diagram of a right-hand circular polarization.

Referring to FIG. 4, FIG. 4 is circuit diagrams of a pair of adjacent the circular polarized transmitting antenna 120 and the circular polarized receiving antenna 130 in a frame line shown in FIG. 3 respectively connected to the phase modifier 20. The circular polarized transmitting antenna 120 is a conductor, which is substantially a sheet shaped. The circular polarized transmitting antenna 120 is arranged with a first feed point 121 and a second feed point 122. The first feed point 121 and the second feed point 122 are arranged in orthogonality. That is, a first diameter of the circular polarized transmitting antenna 120 is formed between the first feed point 121 and a center point of the circular polarized transmitting antenna 120, a second diameter of the circular polarized transmitting antenna 120 is formed between the second feed point 122 and the center point of the circular polarized transmitting antenna 120, the first diameter and the second diameter are in orthogonality. Furthermore, the first feed point 121 and the second feed point 122 may supply electric current into the circular polarized transmitting antenna 120, respectively, to form two electric current paths, the two electric current paths are in orthogonality. When a difference between a phase of the electric current supplied by the first feed point 121 and a phase of the electric current supplied by the second feed point 122 is 90 degrees, radio waves transmitted by the circular polarized transmitting antenna 120 may have a circular polarized effect. Thus, affection of wireless signals radiated by the circular polarized transmitting antenna 120 when passing through atmosphere can be decreased. Referring to FIG. 5A, when the phase of the electric current supplied by the first feed point 121 is ahead of the phase of the electric current supplied by the second feed point 122 by 90 degrees, the circular polarized transmitting antenna 120 may generate a left-hand circular polarization. Referring to FIG. 5B, when the phase of the electric current supplied by the second feed point 122 is ahead of the phase of the electric current supplied by the first feed point 121 by 90 degrees, the circular polarized transmitting antenna 120 may generate a right-hand circular polarization. In at least one embodiment, the circular polarized transmitting antenna 120 is substantially a circular sheet shaped conductor.

A structure of the circular polarized transmitting antenna 120 and a structure of the circular polarized receiving antenna 130 are substantially the same. The circular polarized receiving antenna 130 is arranged with a third feed point 131 and a fourth feed point 132. The third feed point 131 and the second feed point 132 are arranged in orthogonality. That is, a first diameter of the circular polarized receiving antenna 130 is formed between the third feed point 131 and a center point of the circular polarized receiving antenna 130, a second diameter of the circular polarized receiving antenna 130 is formed between the fourth feed point 132 and the center point of the circular polarized receiving antenna 130, the first diameter and the second diameter are in orthogonality. Furthermore, the third feed point 131 and the fourth feed point 132 may supply electric current into the circular polarized receiving antenna 130, respectively, to form two electric current paths, the two electric current paths are in orthogonality. When a difference between a phase of the electric current supplied by the third feed point 131 and a phase of the electric current supplied by the fourth feed point 132 is 90 degrees, radio waves received by the circular polarized receiving antenna 130 may have a circular polarized effect. In at least one embodiment, the circular polarized receiving antenna 130 is substantially a circular sheet shaped conductor.

Structures and sizes of the circular polarized transmitting antenna 120 and the circular polarized receiving antenna 130 are not limited by the present disclosure, which may be adjusted by the technology designer according to actual demands. In at least one embodiment, an area of the circular polarized transmitting antenna 120 is smaller than an area of the circular polarized receiving antenna 130, thereby the circular polarized transmitting antenna 120 can transmit radiation signals to the circular polarized receiving antenna 130 with a higher frequency. In another embodiment, the area of the circular polarized transmitting antenna 120 is greater than the area of the circular polarized receiving antenna 130, thereby the circular polarized transmitting antenna 120 can transmit radiation signals to the circular polarized receiving antenna 130 with a lower frequency. In another embodiment, the area of the circular polarized transmitting antenna 120 is equal to the area of the circular polarized receiving antenna 130, thereby the circular polarized transmitting antenna 120 can transmit radiation signals to the circular polarized receiving antenna 130 with same frequencies. The circular polarized transmitting antenna 120 and the circular polarized receiving antenna 130 can be conductors in other shapes, such as oval, rectangular, etc.

Sizes of the first predetermined distance R1 and the second predetermined distance R2 are not limited by the present disclosure. In at least one embodiment, the first predetermined distance R1 may be equal to or not equal to the second predetermined distance R2.

In at least one embodiment, the phase modifier 20 includes a plurality of first group of phase shifting units 210 and a plurality of second group of phase shifting units 220. In at least one embodiment, a quantity of the first group of phase shifting units 210 is equal to a quantity of the circular polarized transmitting antennas 120, a quantity of the second group of phase shifting units 220 is equal to a quantity of the circular polarized receiving antennas 130. The first group of phase shifting units 210 are electrically connected to the circular polarized transmitting antennas 120. Each of the first group of phase shifting units 210 is electrically connected to each of the circular polarized transmitting antennas 120 respectively. The second group of phase shifting units 220 are electrically connected to the circular polarized receiving antennas 130. Each of the second group of phase shifting units 220 is electrically connected to each of the circular polarized receiving antennas 130 respectively. Thus, each of the first group of phase shifting units 210 is configured to adjust phases of the transmitting signals transmitted by corresponding circular polarized transmitting antenna 120. Each of the second group of phase shifting units 220 is configured to adjust phases of the return signals received by corresponding circular polarized receiving antennas 130. In at least one embodiment, the first group of phase shifting units 210 and the second group of phase shifting units 220 are arranged on the dielectric substrate 110.

In addition, each of the first group of phase shifting units 210 includes a plurality of first phase shifters 213 (shown in FIG. 10), a quantity of the first phase shifters 213 in the first group of phase shifting unit 210 is equal to a quantity of feed points of the circular polarized transmitting antenna 120. That is, in at least one embodiment, each of the first group of phase shifting units 210 includes two first phase shifters 213. The two first phase shifters 213 are respectively configured to adjust phases of the electrical current supplied by the first feed point 121 and the second feed point 122 of the circular polarized transmitting antenna 120. Similarly, each of the second group of phase shifting units 220 includes a plurality of second phase shifters 222 (shown in FIG. 10), a quantity of the second phase shifters 222 in the second group of phase shifting unit 220 is equal to a quantity of feed points of the circular polarized receiving antenna 130. That is, in at least one embodiment, each of the second group of phase shifting unit 220 includes two second phase shifters 222. The two second phase shifters 222 are respectively configured to adjust phases of the electric current supplied by the third feed point 131 and the fourth feed point 132 of the circular polarized receiving antenna 130. Thus, each circular polarized transmitting antennas 120, by each first group of phase shifting unit 210, adjusts the phase of the electric current supplied by the first feed point 121 into the circular polarized transmitting antennas 120, and adjusts the phase of the electric current supplied by the second feed point 122 into the circular polarized transmitting antennas 120. A phase difference between the phase of the electric current supplied by the first feed point 121 and the phase of the electric current supplied by the second feed point 122 is 90 degrees. Each circular polarized receiving antenna 130, by each second group of phase shifting unit 220, adjusts the phase of the electric current supplied by the third feed point 131 into the circular polarized receiving antenna 130, and adjusts the phase of the electric current supplied by the fourth feed point 132 into the circular polarized receiving antenna 130. A phase difference between the phase of the electric current supplied by the third feed point 131 and the phase of the electric current supplied by the fourth feed point 132 is 90 degrees.

Figure 6:
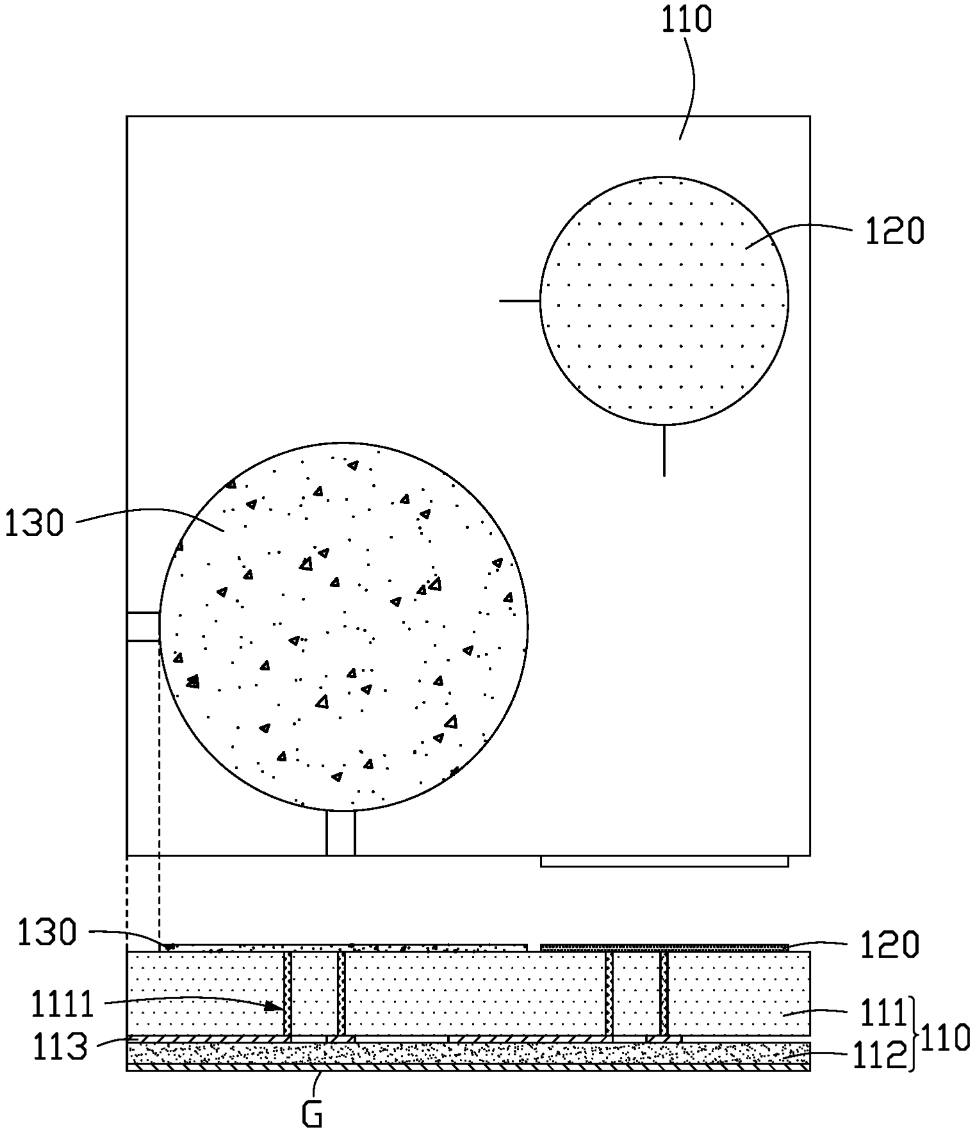
FIG. 6 is a cross-sectional view of the antenna array according to at least one embodiment of the present disclosure.

Referring to FIG. 6, in at least one embodiment, the circular polarized transmitting antennas 120 and the circular polarized receiving antennas 130 supplies electric current by direct feeding. For instance, in at least one embodiment, the dielectric substrate 110 includes a first substrate 111 and a second substrate 112. The first substrate 111 is overlapped on the second substrate 112. A surface of the first substrate 111 away from the second substrate 112 is arranged with the circular polarized transmitting antennas 120 and the circular polarized receiving antennas 130. A surface of the second substrate 112 away from the first substrate 111 is arranged with a ground layer G, the ground layer G is configured to provide ground for the circular polarized transmitting antennas 120 and the circular polarized receiving antennas 130. The first substrate 111 defines a plurality of first holes 1111. A feed line 113 is arranged between the first substrate 111 and the second substrate 112. Thus, the feed line 113, through the first holes 1111, supplies electric current to corresponding feed points (such as the first feed point 121, the second feed point 122, the third feed point 131, and the fourth feed point 132), rendering corresponding antennas (such as the circular polarized transmitting antennas 120 and the circular polarized receiving antennas 130) to generate corresponding radiation signals.

Figure 7:
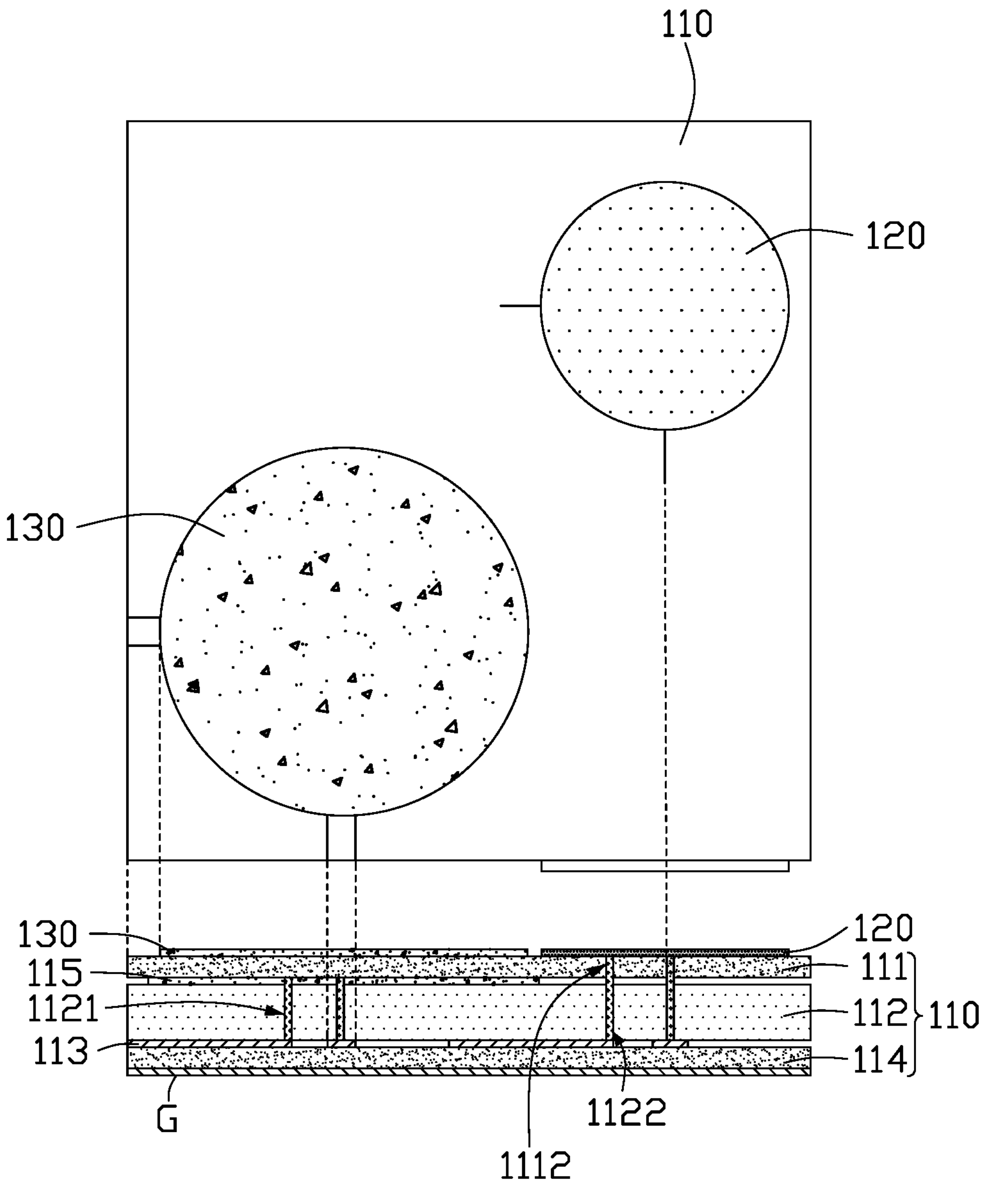
FIG. 7 is a cross-sectional view of the antenna array according to another embodiment of the present disclosure.

Referring to FIG. 7, in other embodiments, the circular polarized transmitting antennas 120 may supply electric current by direct feeding, the circular polarized receiving antennas 130 may receive electric current by couple feeding. For instance, in at least one embodiment, the dielectric substrate 110 includes the first substrate 111, the second substrate 112, and a third substrate 114 overlapped in that order. The surface of the first substrate 111 away from the second substrate 112 is arranged with the circular polarized transmitting antennas 120 and the circular polarized receiving antennas 130. A surface of the third substrate 114 away from the second substrate 112 is arranged with the ground layer G, the ground layer G is configured to provide ground for the circular polarized transmitting antennas 120 and the circular polarized receiving antennas 130. A coupling layer 115 is arranged between the first substrate 111 and the second substrate 112, the coupling layer 115 is corresponding to the circular polarized receiving antenna 130. The second substrate 112 defines a plurality of second holes 1121, the feed line 113 is arranged between the second substrate 112 and the third substrate 114. Thus, the feed line 113, through the second holes 1121, supplies electric current to the coupling layer 115, by the coupling between the coupling layer 115 and the circular polarized receiving antennas 130, the electric current is coupled to the circular polarized receiving antennas 130, rendering the circular polarized receiving antennas 130 to generate corresponding radiation signals, and receiving wireless signals transmitted by other wireless communication devices. The second substrate 112 further defines a plurality of third holes 1122 corresponding to the circular polarized transmitting antennas 120. The first substrate 111 defines a plurality of fourth holes 1112 corresponding to the circular polarized transmitting antennas 120, the fourth holes 1112 are communicated with the third holes 1122 respectively. Thus, the feed line 113, through the third holes 1122 and the fourth holes 1112, directly supplies electric current to the circular polarized transmitting antennas 120, rendering the circular polarized transmitting antennas 120 to generate corresponding radiation signals, and receiving wireless signals transmitted by other wireless communication devices.

Figure 8A:
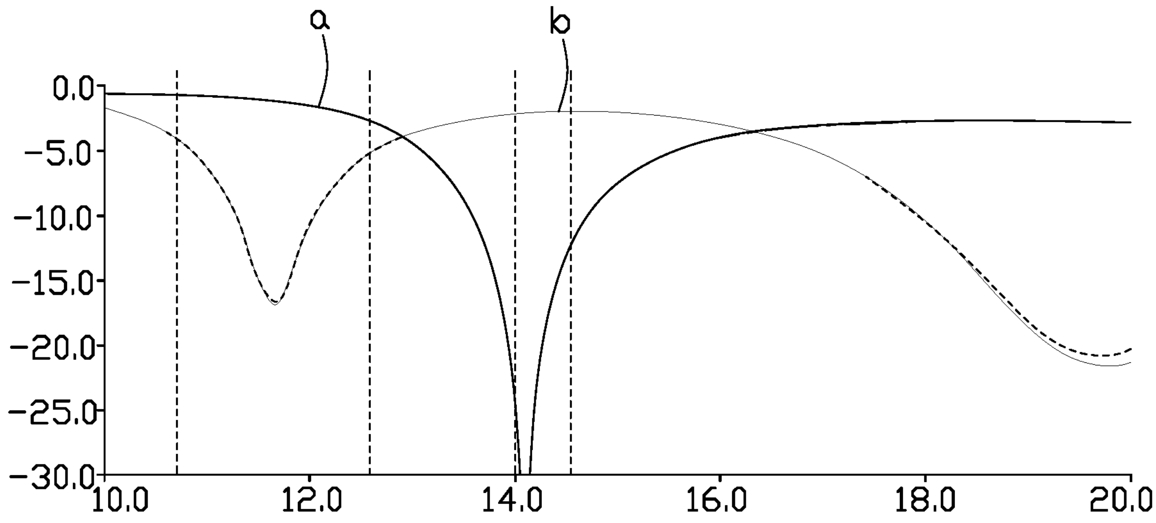
FIG. 8A is a graph of return loss of the circular polarized transmitting antennas and the circular polarized receiving antennas of FIG. 6.
Figure 8B:
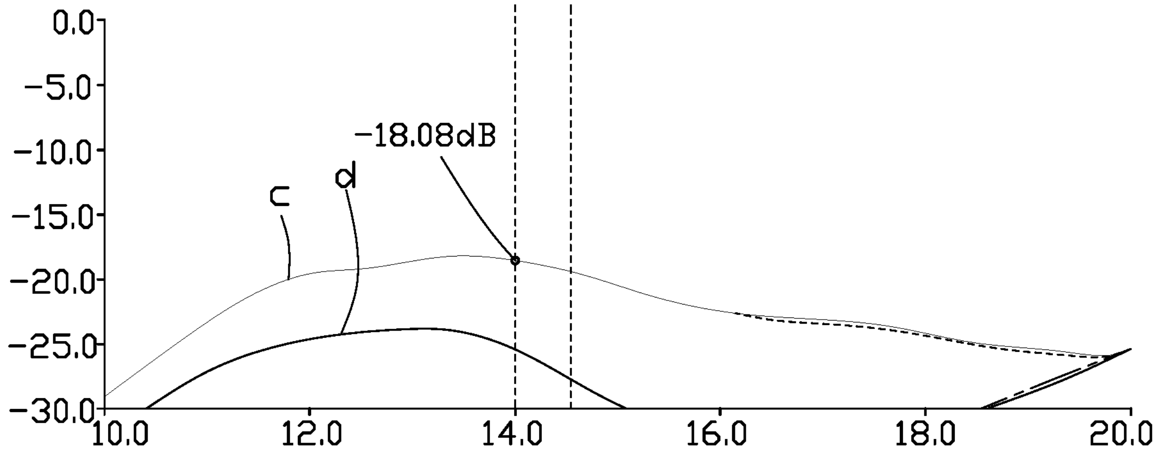
FIG. 8B is a graph of isolation curve of the circular polarized transmitting antennas and the circular polarized receiving antennas of FIG. 6.

Referring to FIGS. 8A, 8B, 9A, and 9B, a curve a shown in FIG. 8A is a graph of return loss of the circular polarized transmitting antennas 120 shown in FIG. 6, a curve b is a graph of return loss of the circular polarized receiving antennas 130 shown in FIG. 6. A curve c shown in FIG. 8B is a graph of isolation detecting the first feed point 121 of the circular polarized transmitting antennas 120 and the third feed point 131 of the circular polarized receiving antennas 130, and the second feed point 122 of the circular polarized transmitting antennas 120 and the fourth feed point 132 of the circular polarized receiving antennas 130 shown in FIG. 6; a curve d is a graph of isolation detecting the first feed point 121 of the circular polarized transmitting antennas 120 and the fourth feed point 132 of the circular polarized receiving antennas 130, and the second feed point 122 of the circular polarized transmitting antennas 120 and the third feed point 131 of the circular polarized receiving antennas 130 shown in FIG. 6.

Figure 9A:
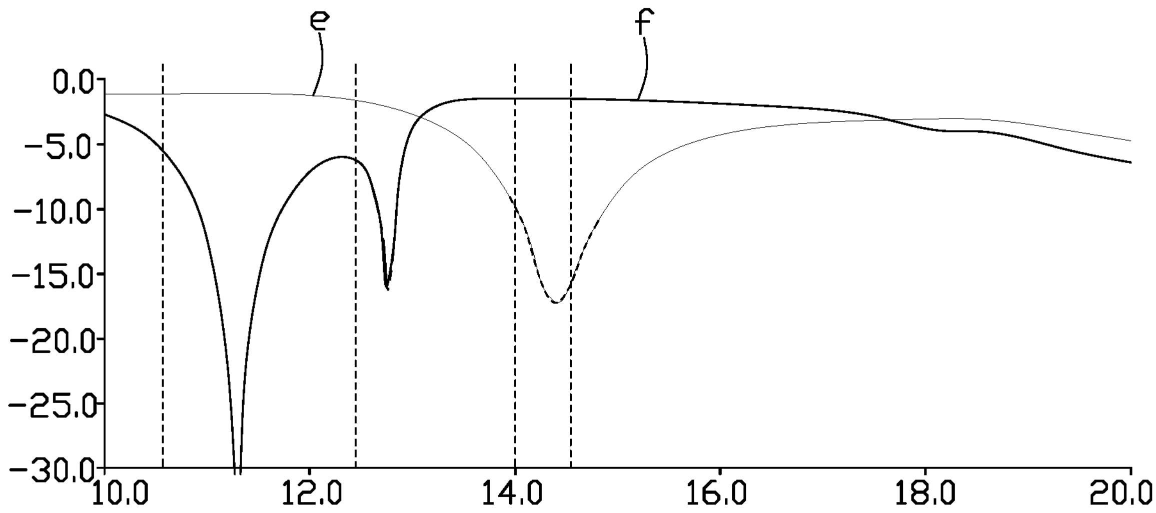
FIG. 9A is a graph of return loss of the circular polarized transmitting antennas and the circular polarized receiving antennas of FIG. 7.
Figure 9B:
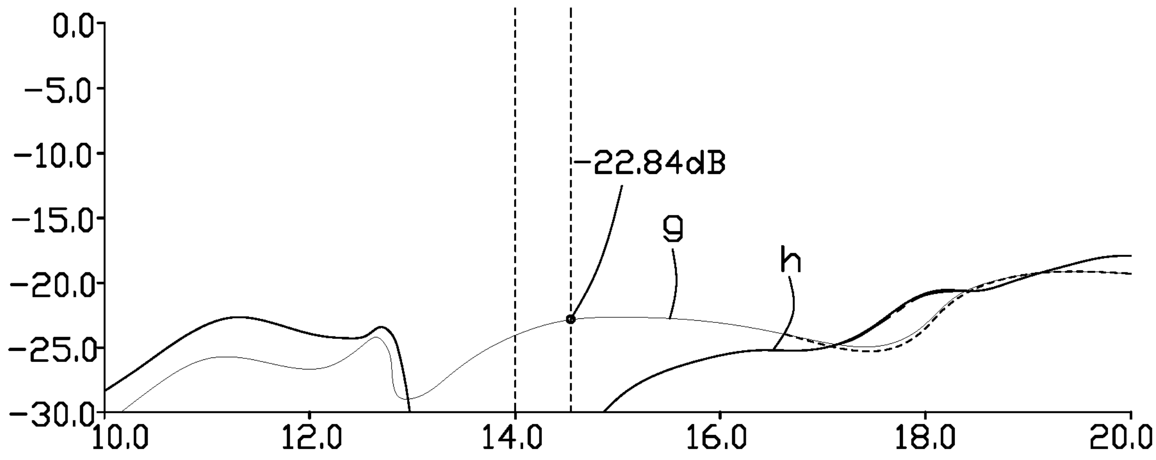
FIG. 9B is a graph of isolation curve of the circular polarized transmitting antennas and the circular polarized receiving antennas of FIG. 7.

A curve e shown in FIG. 9A is a graph of return loss of the circular polarized transmitting antennas 120 shown in FIG. 7, a curve fis a graph of return loss of the circular polarized receiving antennas 130 shown in FIG. 7. A curve g shown in FIG. 9B is a graph of isolation detecting the first feed point 121 of the circular polarized transmitting antennas 120 and the third feed point 131 of the circular polarized receiving antennas 130, and the second feed point 122 of the circular polarized transmitting antennas 120 and the fourth feed point 132 of the circular polarized receiving antennas 130 shown in FIG. 7; a curve h is a graph of isolation detecting the first feed point 121 of the circular polarized transmitting antennas 120 and the fourth feed point 132 of the circular polarized receiving antennas 130, and the second feed point 122 of the circular polarized transmitting antennas 120 and the third feed point 131 of the circular polarized receiving antennas 130 shown in FIG. 7.

As known from FIGS. 8A and 9A, a working frequency band of the circular polarized transmitting antennas 120 shown in FIGS. 6 and 7 may include 14 GHz-14.5 GHZ, a working frequency band of the circular polarized receiving antennas 130 may include 10.7 GHZ-12.5 GHz. As known from FIGS. 8B and 9B, the isolation between the circular polarized transmitting antennas 120 and the circular polarized receiving antennas 130 may meet the antenna working requirements. Especially, the isolation between the circular polarized transmitting antennas 120 and the circular polarized receiving antennas 130 shown in FIG. 7 may be greater than −20 dB, which may be a high isolation and good for decreasing the interface between the circular polarized transmitting antennas 120 and the circular polarized receiving antennas 130.

Figure 10:
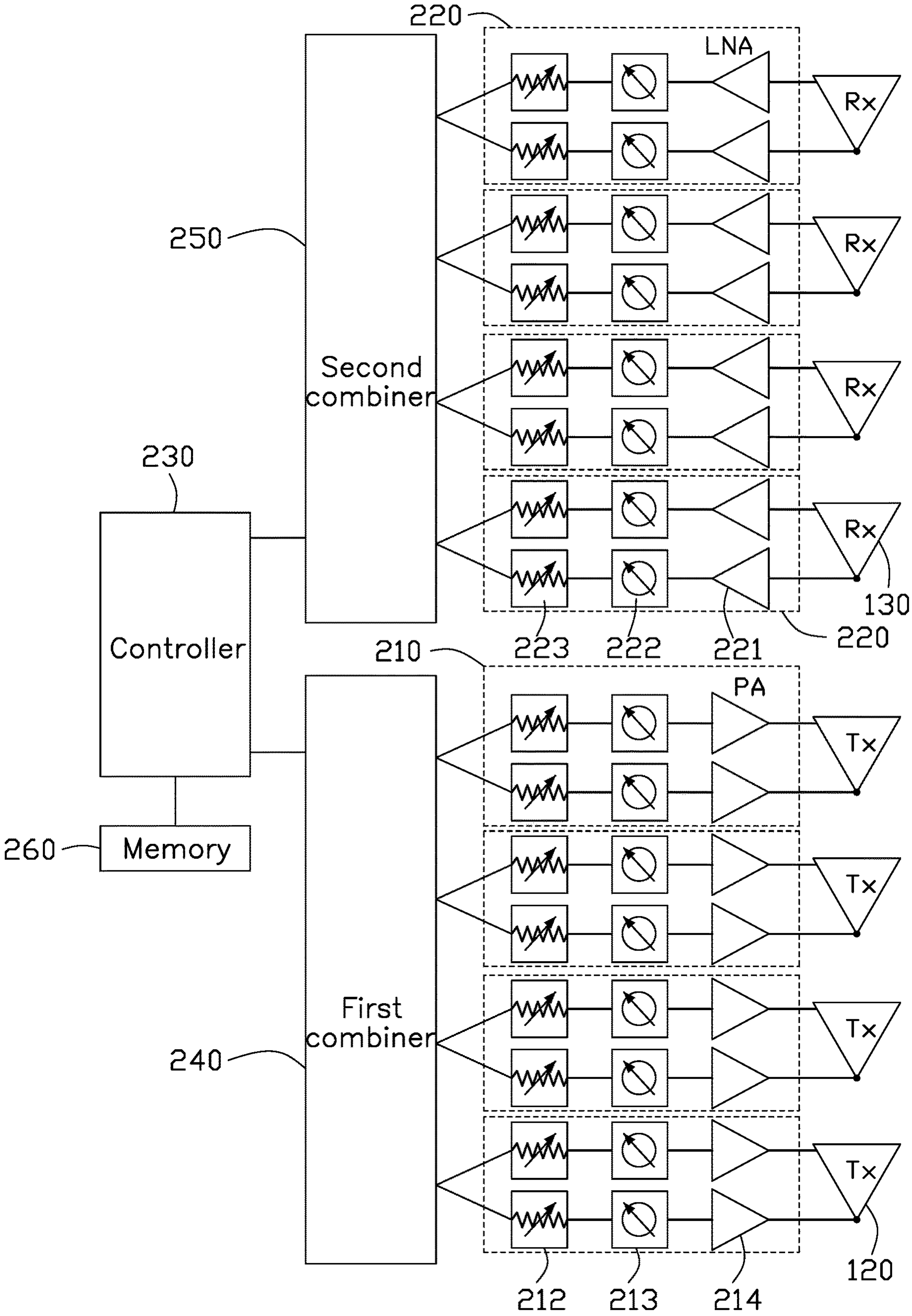
FIG. 10 is a circuit diagram of a phase modifier according to at least one embodiment of the present disclosure.

Referring to FIG. 10, in at least one embodiment, the phase modifier 20 further includes a controller 230, a first combiner 240, and a second combiner 250. The first group of phase shifting units 210 further includes two first attenuators 212 and two power amplifiers (PAS) 214. The second group of phase shifting units 220 further includes two low noise amplifiers (LNAs) 221 and two second attenuators 223.

A working process of the circular polarized antenna array module 1 transmitting signals may be described as follows: the controller 230 divides a transmitting signal into multiple transmitting signals through the first combiner 240, the multiple transmitting signals are input to the first attenuators 212 to be adjusted corresponding transmitting power. Each first attenuator 212 is electrically connected to the corresponding first phase shifter 213, each first phase shifter 213 adjusts the phase of the corresponding transmitting signal. Each first phase shifter 213 is further electrically connected to the feed point (such as the first feed point 121 or the second feed point 122) of the corresponding circular polarized transmitting antenna 120 through corresponding PA 214, to convert each transmitting signal into electromagnetic wave for radiation through the corresponding circular polarized transmitting antenna 120, and form wave beam of the corresponding transmitting signal.

A working process of the circular polarized antenna array module 1 receiving signals may be described as follows: each feed point (such as the third feed point 131 or the fourth feed point 132) of the circular polarized receiving antennas 130 is electrically connected to corresponding LNA 221, to amplify received return signals through the LNA 221. Each LNA 221 is further electrically connected to corresponding second phase shifter 222, to adjust phase of amplified return signals through the second phase shifter 222. Each second phase shifter 222 is further electrically connected to corresponding second attenuator 223, each second attenuator 223 is further electrically connected to the controller 223 through the second combiner 250. Thus, the controller 230 may obtain electric signals through the second combiner 250 and process the received electric signals, to obtain information corresponding to the return signals.

Therefore, the controller 230 may control output power of each circular polarized transmitting antennas 120 through the first attenuators 212 of the transmitting end, and control the phase of the signals transmitted to corresponding circular polarized transmitting antenna 120 through each first phase shifter 213 of the transmitting end, so the signals transmitted by the circular polarized transmitting antenna 120 may have circular polarized effect and wave beam angle controlling when the antenna array 10 transmits signals may be archived. The controller 230 may independently adjust the phase of the return signals received by the circular polarized receiving antennas 130 through each second phase shifter 222 of the receiving end, so the return signals received by the circular polarized receiving antennas 130 may have circular polarized effect and wave beam angle controlling when the antenna array 10 receives signals may be archived, so the circular polarized receiving antennas 130 may adjust wave beam angle of the received signals according to different satellite positions. Therefore, in at least one embodiment, the controller 230 may divide the circular polarized transmitting antennas 120 into a plurality of units and control the circular polarized transmitting antennas 120 of corresponding unit to transmit signals in corresponding phase. The controller 230 may divide the circular polarized receiving antennas 130 into a plurality of units and control the circular polarized receiving antennas 130 of corresponding unit to receive signals in corresponding phase.

In at least one embodiment, the phase modifier 20 further includes a memory 260. The controller 230 is electrically connected to the memory 260 to obtain radio frequency related information stored in the memory 260, such as phase information, power and amplitude information, etc. Thus, the memory 260 can be configured to assist the controller 230 to achieve the abovementioned controlling process. The memory 260 may be an internal storage or an external storage, such as Smart Media Card, Secure Digital Card, Flash Card, etc.

Figure 11:
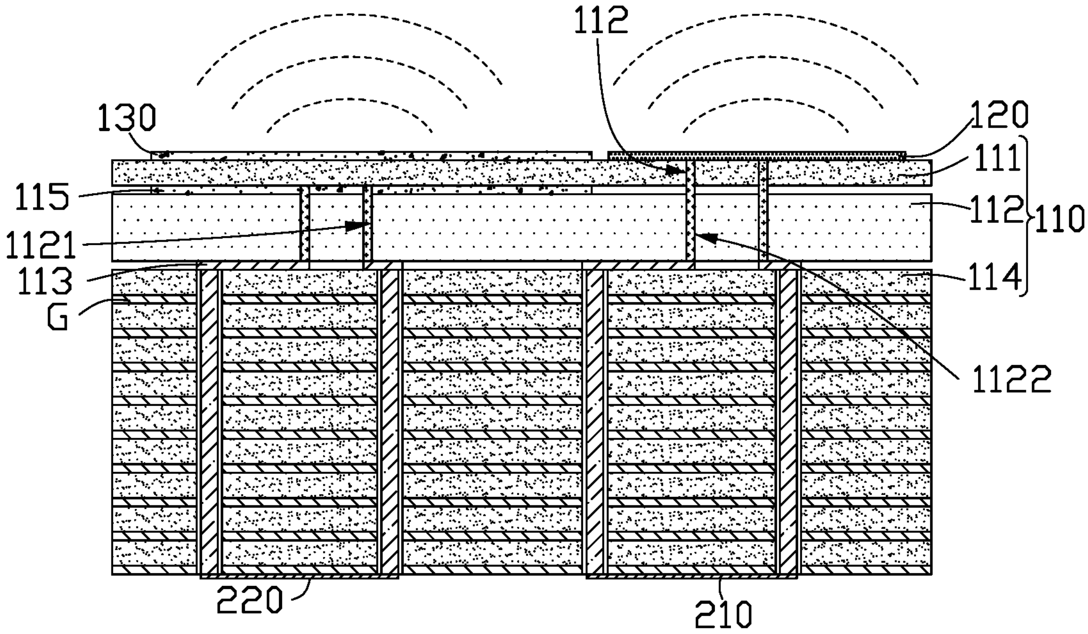
FIG. 11 is a cross-sectional view of the antenna array according to another embodiment of the present disclosure.

The first group of phase shifting units 210 and the second group of phase shifting units 220 of the phase modifier 20 are arranged on a side of the antenna array 10 away from the circular polarized transmitting antennas 120 and the circular polarized receiving antennas 130, the first group of phase shifting units 210 and the second group of phase shifting units 220 are electrically connected to the circular polarized transmitting antennas 120 and the circular polarized receiving antennas 130 through the holes in the first substrate 111, the second substrate 112, and the third substrate 114. Furthermore, referring to FIG. 11, in at least one embodiment, the antenna array 10 is arranged with a plurality of third substrates 114, each third substrate 114 defines holes, which provides wiring arrangement for radio frequency circuits, power source supplies, and control signals of the antenna array 10. Thus, the first group of phase shifting units 210 and the second group of phase shifting units 220 are electrically connected to the circular polarized transmitting antennas 120 and the circular polarized receiving antennas 130 through the holes in the plurality of third substrates 114, so the circular polarized transmitting antennas 120 can transmit radio frequency signals, the circular polarized receiving antennas 130 can receive return signals to obtain corresponding information.

Figure 12:
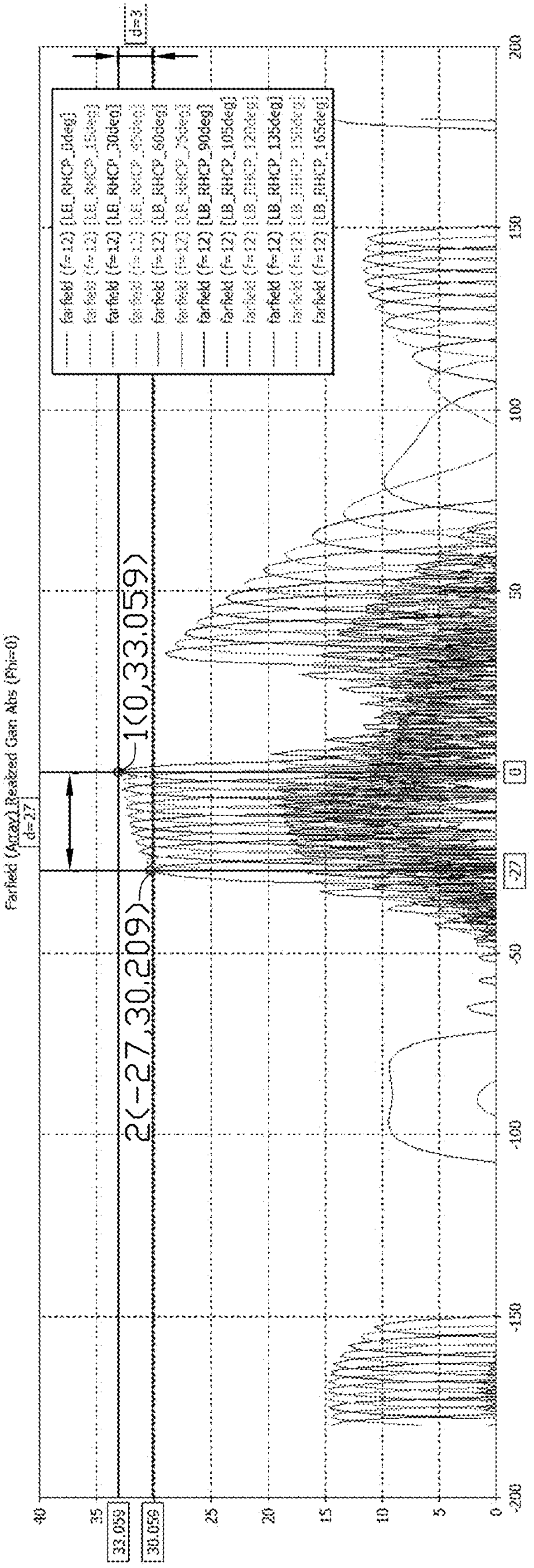
FIG. 12 is a far field gain diagram when the circular polarized antenna array module transmitting and receiving signals through beam forming technology according to at least one embodiment of the present disclosure.
Figure 13A:
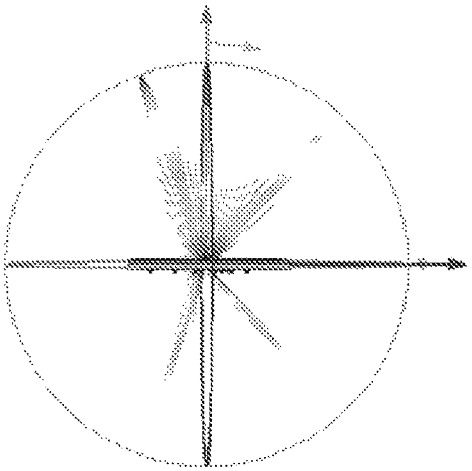
FIGS. 13A, 13B, 13C, 13D, and 13E are radiating patterns of the circular polarized antenna array module in different phases according to at least one embodiment of the present disclosure.
Figure 13B:
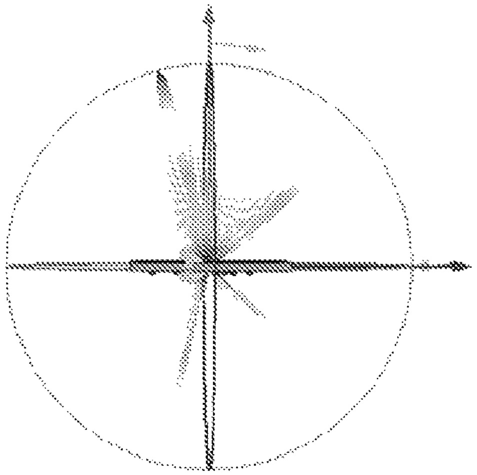
Figure 13C:
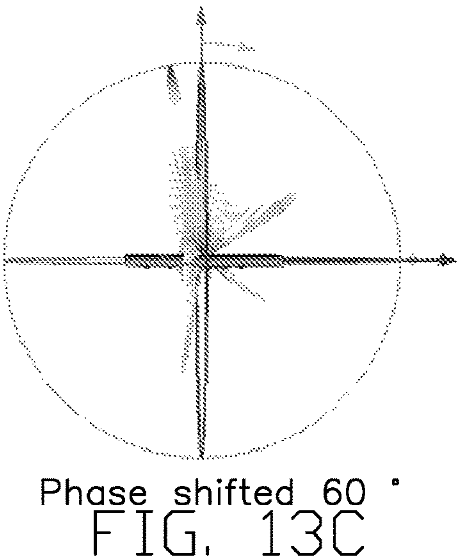
Figure 13D:
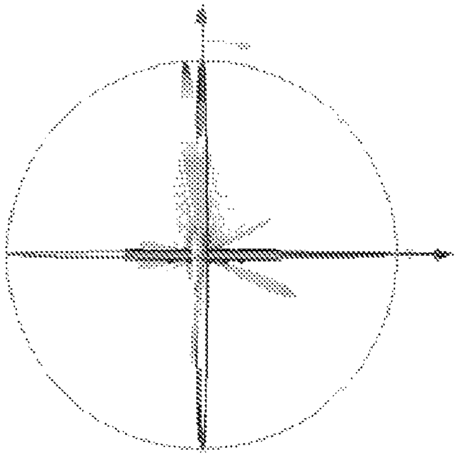
Figure 13E:
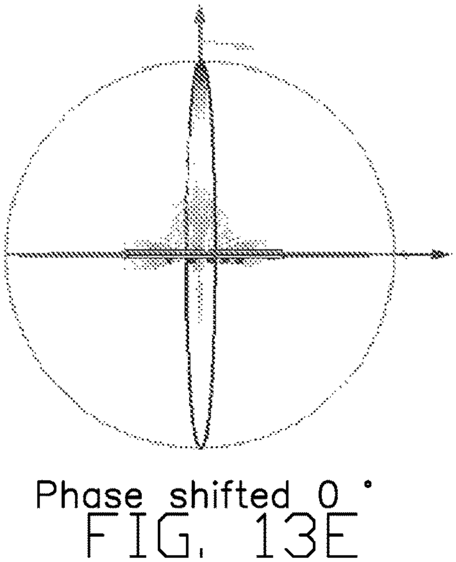

Referring to FIGS. 12 to 14B, in at least one embodiment, the circular polarized antenna array module 1 including 32*32 circular polarized transmitting antennas 120 and 32*32 circular polarized receiving antennas 130 is set for example, data of the circular polarized antenna array module 1 such as far field gains, radiation patterns, radiation gains, and axial ratio of circular polarization can be detected. FIG. 12 illustrates a far field gain diagram when the circular polarized antenna array module transmitting and receiving signals through beam forming technology. FIGS. 13A-13E illustrate radiating patterns of the circular polarized antenna array module in different phases. Known from FIG. 12, the circular polarized antenna array module 1 may adjust a wave beam direction of the antenna array 10 through the phase modifier 20, the signal wave beams formed by the circular polarized antenna array module 1 have high gains. Known from FIGS. 13A to 13E, radiation energy of the circular polarized antenna array module 1 may discretionarily switch wave beam angles according to different positions in the orbit of the satellite, which is good for a great communication effect with low-orbit satellites.

Figure 14A:
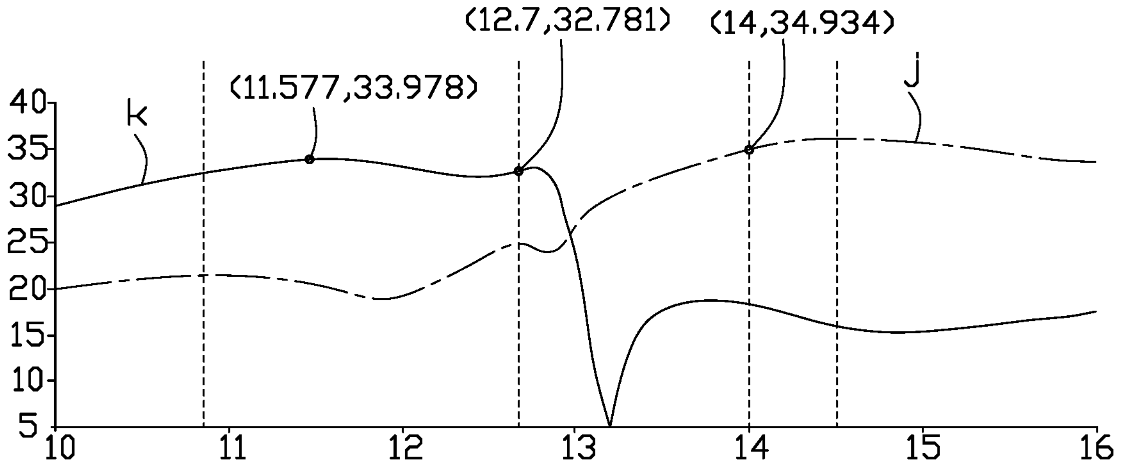
FIG. 14A is a gain diagram of the circular polarized antenna array module according to at least one embodiment of the present disclosure.
Figure 14B:
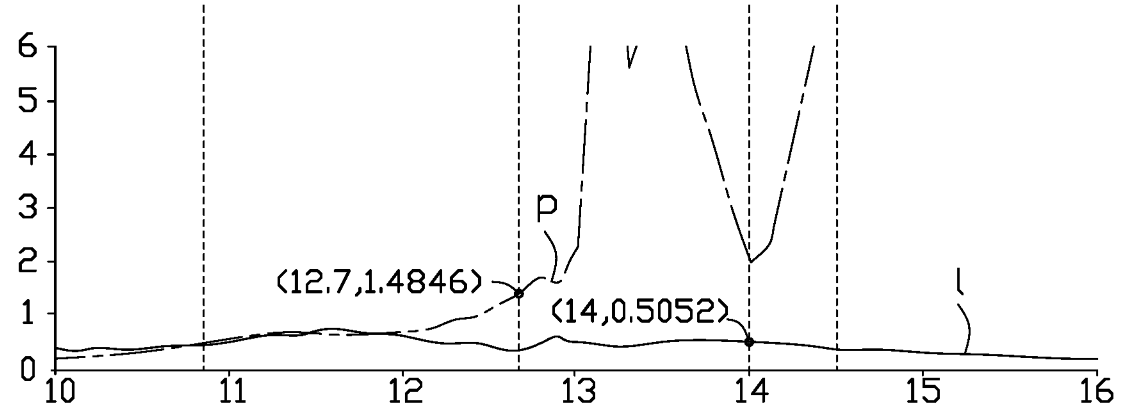
FIG. 14B is a circular polarized axial ration diagram of the circular polarized antenna array module according to at least one embodiment of the present disclosure.

A curve j shown in FIG. 14A illustrates a gain diagram when the 32*32 circular polarized transmitting antennas 120 of the circular polarized antenna array module 1 are working. A curve k shown in FIG. 14A illustrates a gain diagram when the 32*32 circular polarized receiving antennas 130 of the circular polarized antenna array module 1 are working. A curve 1 shown in FIG. 14B illustrates a circular polarized axial ration diagram when the 32*32 circular polarized transmitting antennas 120 of the circular polarized antenna array module 1 are working. A curve p shown in FIG. 14B illustrates a circular polarized axial ration diagram when the 32*32 circular polarized receiving antennas 130 of the circular polarized antenna array module 1 are working. Known from FIG. 14A, a maximum gain of the antenna array 10 of the circular polarized antenna array module 1 may reach 35 dBic. Known from FIG. 14B, the circular polarized axial ration of the receiving antenna of the antenna array 10 of the circular polarized antenna array module 1 may be less than 1.5 dB, which has a great circular polarized effect. In summary, the circular polarized antenna array module 1 can meet design requirements of antennas for low-orbit satellite communication.

A quantity of the feed points of the circular polarized transmitting antennas 120 and the circular polarized receiving antennas 130 is not limited by the present disclosure. For instance, in at least one embodiment, the circular polarized transmitting antennas 120 and/or the circular polarized receiving antennas 130 are/is arranged with one feed point, the feed point may be corresponding to two orthometric electric current paths generated by the circular polarized transmitting antennas 120 and the circular polarized receiving antennas 130.

Figure 15:
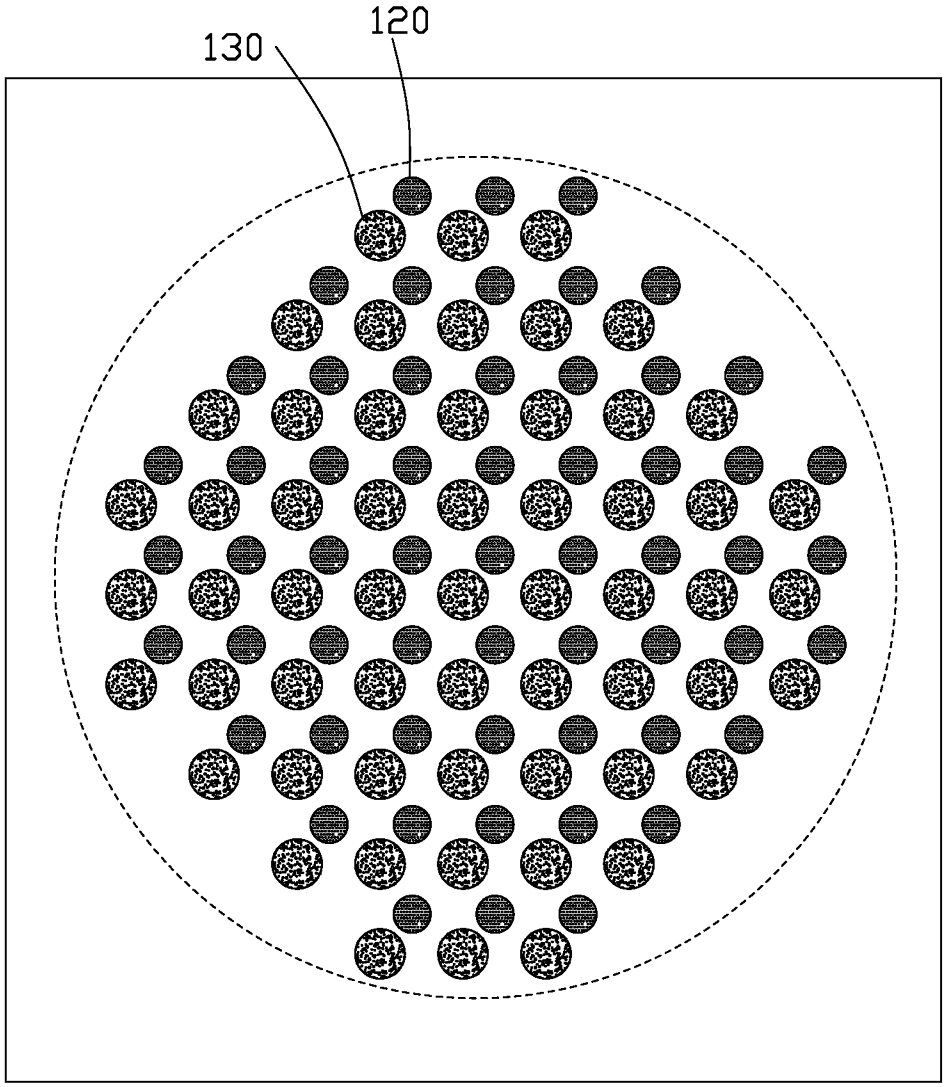
FIG. 15 a distribution diagram of circular polarized transmitting antennas and circular polarized receiving antennas of an antenna array according to another embodiment of the present disclosure.

The arrangement of the circular polarized transmitting antennas 120 and the circular polarized receiving antennas 130 of the antenna array 10 is not limited to as shown in FIG. 3. For instance, in at least one embodiment, a plurality of rows of the circular polarized receiving antennas 130 and a plurality of rows of the circular polarized transmitting antennas 120 are alternately arranged, to form the antenna array 10. Referring to FIG. 15, in other embodiments, the circular polarized transmitting antennas 120 and the circular polarized receiving antennas 130 form a circular array on the dielectric substrate 110.

Figure 16A:
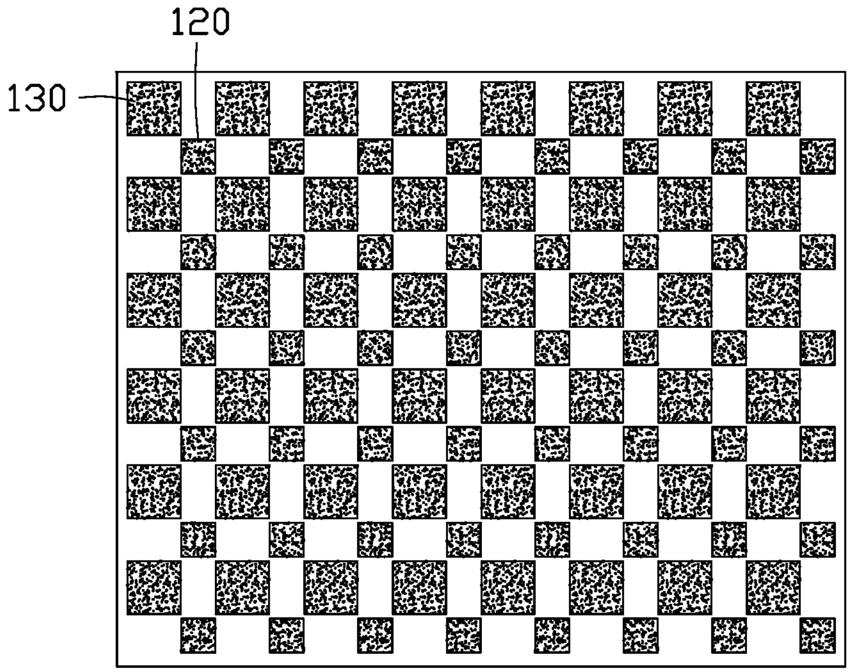
FIGS. 16A and 16B are distribution diagrams circular polarized transmitting antennas and circular polarized receiving antennas of an antenna array according to other embodiments of the present disclosure.
Figure 16B:
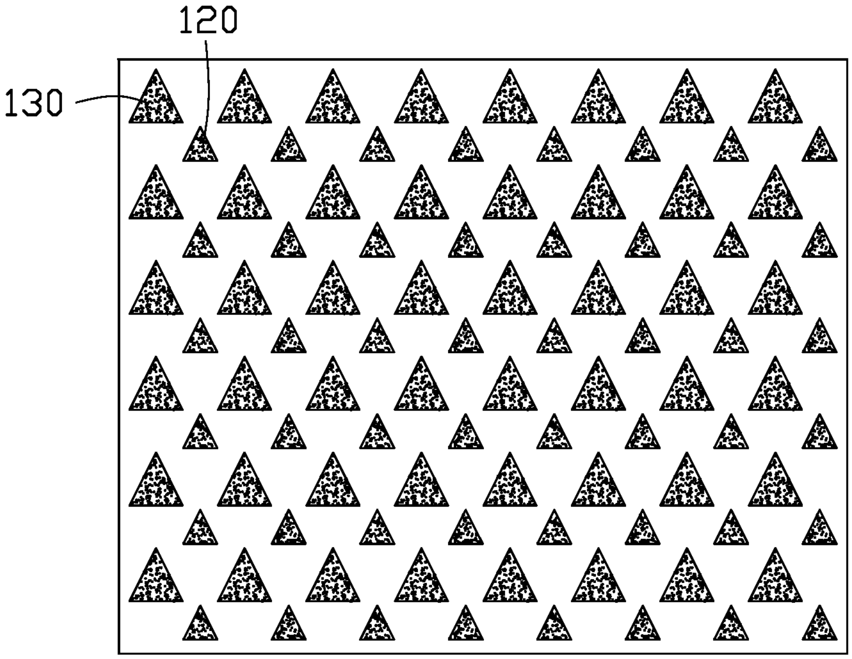

The structures of the circular polarized transmitting antennas 120 and the circular polarized receiving antennas 130 are not limited by the present disclosure. For instance, referring to FIGS. 16A and 16B, in at least one embodiment, the circular polarized transmitting antennas 120 and the circular polarized receiving antennas 130 are square sheet conductors. In another embodiment, the circular polarized transmitting antenna 120 and the circular polarized receiving antenna 130 are triangle sheet conductors. In a same antenna array 10, the structures of the circular polarized transmitting antennas 120 and the circular polarized receiving antennas 130 can be same or different.

Working frequency bands of the circular polarized transmitting antennas 120 of the antenna array 10 can be different; working frequency bands of the circular polarized receiving antenna 130 of the antenna array 10 can be different. In other embodiments, the circular polarized transmitting antennas 120 can have different areas, the smaller the area of the circular polarized transmitting antenna 120, the higher frequencies of the radiation signals transmitted by the circular polarized transmitting antenna 120 will be. The greater the area of the circular polarized transmitting antenna 120, the lower frequencies of the radiation signals transmitted by the circular polarized transmitting antenna 120 will be. Similarly, the circular polarized receiving antennas 130 can have different areas, the greater the area of the circular polarized receiving antenna 130, the lower frequencies of the radiation signals received by the circular polarized receiving antenna 130 will be.

Figure 17:
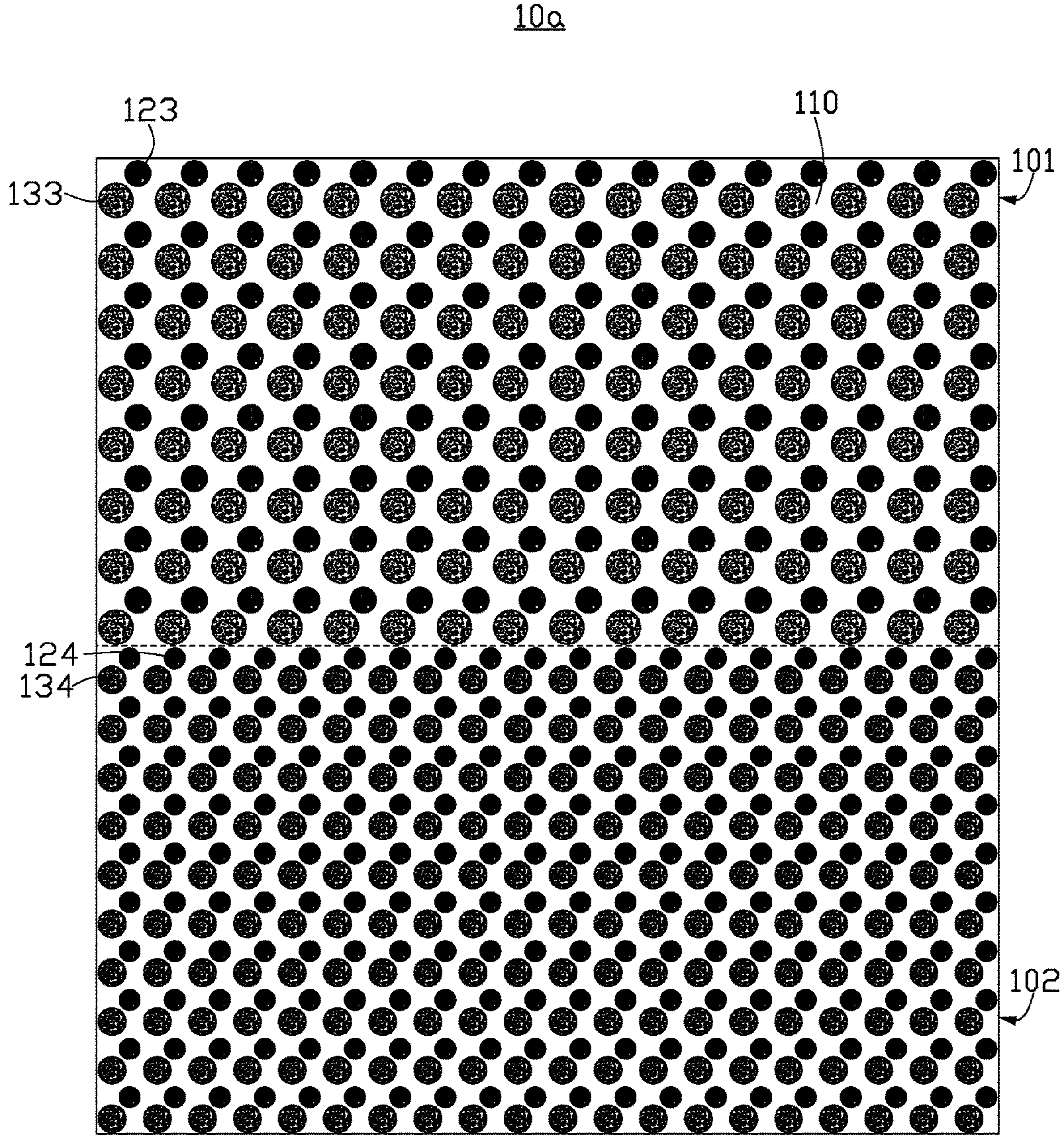
FIG. 17 is a distribution diagram of circular polarized transmitting antennas and circular polarized receiving antennas of an antenna array according to another embodiment of the present disclosure.

For instance, referring to FIG. 17, an antenna array 10*a* is provided by another embodiment of the present disclosure, the circular polarized transmitting antennas 120 include a plurality of rows of first circular polarized transmitting antennas 123 and a plurality of rows of second circular polarized transmitting antennas 124. The circular polarized receiving antennas 130 include a plurality of rows of first circular polarized receiving antennas 133 and a plurality of rows of second circular polarized receiving antennas 134. The first circular polarized transmitting antennas 123 in each row and the first circular polarized receiving antennas 133 in each row are arranged in a first alternate arrangement, to form a first antenna array 101. The second circular polarized transmitting antennas 124 in each row and the second circular polarized receiving antennas 134 in each row are arranged in a second alternate arrangement, to form a second antenna array 102. The first antenna array 101 radiates at least a first working frequency band and a second working frequency band, the second antenna array 102 radiates at least a third working frequency band and a fourth working frequency band. That is, the first antenna array 101 and the second antenna array 102 radiate at least four working frequency bands. The first working frequency band, the second working frequency band, the third working frequency band, and the fourth working frequency band may be any sub-band of the Ka frequency band or the Ku frequency band. For instance, in at least one embodiment, the first working frequency band includes 14.0 GHz-14.5 GHz; the second working frequency band includes 10.7 GHZ-12.7 GHZ; the third working frequency band includes 27 GHz-30 GHz; the fourth working frequency band includes 18 GHz-28 GHz.

In at least one embodiment, the first antenna array 101 and the second antenna array 102 are arranged on opposite ends of the dielectric substrate 110 (such as the first substrate 111). The first antenna array 101 and the second antenna array 102 can be arranged in other manners, which is not limited by the presented disclosure.

The circular polarized antenna array module 1 of the presented disclosure includes the circular polarized transmitting antennas 120 and the circular polarized receiving antennas 130 arranged on a same dielectric substrate 110, which decreasing the area of the circular polarized antenna array module 1 and being suitable for more wireless communication devices. Additionally, the circular polarized antenna array module 1 of the presented disclosure includes the coupling layer 115 for couple feeding electric current for the circular polarized receiving antennas 130, which improving the isolation between the circular polarized transmitting antennas 120 and the circular polarized receiving antennas 130 and decreasing the interference between the circular polarized transmitting antennas 120 and the circular polarized receiving antennas 130.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A circular polarized antenna array module applied in a wireless communication device, the circular polarized antenna array module comprising:

a plurality of circular polarized transmitting antennas arranged in rows, wherein in each row of the plurality of circular polarized transmitting antennas, every two adjacent circular polarized transmitting antennas are arranged with a first predetermined distance, each of the plurality of circular polarized transmitting antennas is arranged with a first feed point and a second feed point, the first feed point and the second feed point are arranged in orthogonality;

a plurality of circular polarized receiving antennas arranged in rows, wherein in each row of the plurality of circular polarized receiving antennas, every two adjacent circular polarized receiving antennas are arranged with a second predetermined distance, each of the plurality of circular polarized receiving antennas is arranged with a third feed point and a fourth feed point, the third feed point and the fourth feed point are arranged in orthogonality, each of the plurality of circular polarized receiving antennas is placed alternately between two of the plurality of circular polarized transmitting antennas;

a dielectric substrate, each row of the plurality of circular polarized transmitting antennas and each row of the plurality of circular polarized receiving antennas being placed alternately to form array arranged on the dielectric substrate;

a plurality of first group of phase shifting units, each of the plurality of first group of phase shifting units being electrically connected to each of the plurality of circular polarized transmitting antennas respectively, the plurality of first group of phase shifting units being configured to adjust phases of transmitting signals of the plurality of circular polarized transmitting antennas; and a plurality of second group of phase shifting units, each of the plurality of first group of phase shifting units being electrically connected to each of the plurality of circular polarized receiving antennas respectively, the plurality of second group of phase shifting units being configured to adjust phases of return signals received by the plurality of circular polarized receiving antennas;

wherein the plurality of circular polarized transmitting antennas supplies electric currents by direct feeding, the plurality of circular polarized receiving antennas supplies electric currents by couple feeding.

2. The circular polarized antenna array module of claim 1, wherein each of the plurality of circular polarized transmitting antennas adjusts a phase of an electric current supplied to the circular polarized transmitting antenna through the first feed point, and adjusts a phase of an electric current supplied to the circular polarized transmitting antenna through the second feed point by each of the plurality of first group of phase shifting units, a difference between the phase of the electric current supplied through the first feed point and the phase of the electric current supplied through the second feed point is 90 degrees.

3. The circular polarized antenna array module of claim 2, wherein each of the plurality of circular polarized receiving antennas adjusts a phase of an electric current supplied to the circular polarized receiving antenna through the third feed point, and adjusts a phase of an electric current supplied to the circular polarized receiving antenna through the fourth feed point by each of the plurality of second group of phase shifting units, a difference between the phase of the electric current supplied through the third feed point and the phase of the electric current supplied through the fourth feed point is 90 degrees.

4. The circular polarized antenna array module of claim 3, wherein the dielectric substrate comprises a first substrate and a second substrate, a surface of the first substrate away from the second substrate is arranged with the plurality of circular polarized transmitting antennas and the plurality of circular polarized receiving antennas, a surface of the second substrate away from the first substrate is arranged with a ground layer.

5. The circular polarized antenna array module of claim 1, wherein an area of the plurality of circular polarized transmitting antennas is smaller than an area of the plurality of circular polarized receiving antennas.

6. The circular polarized antenna array module of claim 1, wherein the plurality of circular polarized transmitting antennas comprises a plurality of rows of first circular polarized transmitting antennas and a plurality of rows of second circular polarized transmitting antennas; the plurality of circular polarized receiving antennas comprises a plurality of rows of first circular polarized receiving antennas and a plurality of rows of second circular polarized receiving antennas; the first circular polarized transmitting antennas in each row and the first circular polarized receiving antennas in each row are arranged in a first alternate arrangement, to form a first antenna array; the second circular polarized transmitting antennas in each row and the second circular polarized receiving antennas in each row are arranged in a second alternate arrangement, to form a second antenna array.

7. The circular polarized antenna array module of claim 6, wherein the first antenna array and the second antenna array are arranged on opposite ends of the dielectric substrate.

8. The circular polarized antenna array module of claim 6, wherein the first antenna array and the second antenna array radiate at least four working frequency bands.

9. The circular polarized antenna array module of claim 8, wherein the first antenna array radiates a first working frequency band and a second working frequency band, the second antenna array radiates a third working frequency band and a fourth working frequency band, the second working frequency band is smaller than the first working frequency band, the first working frequency band is smaller than the fourth working frequency band, and the fourth working frequency band is smaller than the third working frequency band.

10. A wireless communication device comprising a circular polarized antenna array module, the circular polarized antenna array module comprising:

a plurality of circular polarized transmitting antennas arranged in rows, wherein in each row of the plurality of circular polarized transmitting antennas, every two adjacent circular polarized transmitting antennas are arranged with a first predetermined distance, each of the plurality of circular polarized transmitting antennas is arranged with a first feed point and a second feed point, the first feed point and the second feed point are arranged in orthogonality;

a plurality of circular polarized receiving antennas arranged in rows, wherein in each row of the plurality of circular polarized receiving antennas, every two adjacent circular polarized receiving antennas are arranged with a second predetermined distance, each of the plurality of circular polarized receiving antennas is arranged with a third feed point and a fourth feed point, the third feed point and the fourth feed point are arranged in orthogonality, each of the plurality of circular polarized receiving antennas is placed alternately between two of the plurality of circular polarized transmitting antennas;

a dielectric substrate, each row of the plurality of circular polarized transmitting antennas and each row of the plurality of circular polarized receiving antennas being placed alternately to form array arranged on the dielectric substrate;

a plurality of first group of phase shifting units, each of the plurality of first group of phase shifting units being electrically connected to each of the plurality of circular polarized transmitting antennas respectively, the plurality of first group of phase shifting units being configured to adjust phases of transmitting signals of the plurality of circular polarized transmitting antennas; and a plurality of second group of phase shifting units, each of the plurality of first group of phase shifting units being electrically connected to each of the plurality of circular polarized receiving antennas respectively, the plurality of second group of phase shifting units being configured to adjust phases of return signals received by the plurality of circular polarized receiving antennas;

wherein the plurality of circular polarized transmitting antennas supplies electric currents by direct feeding, the plurality of circular polarized receiving antennas supplies electric currents by couple feeding.

11. The wireless communication device of claim 10, wherein each of the plurality of circular polarized transmitting antennas adjusts a phase of an electric current supplied to the circular polarized transmitting antenna through the first feed point, and adjusts a phase of an electric current supplied to the circular polarized transmitting antenna through the second feed point by each of the plurality of first group of phase shifting units, a difference between the phase of the electric current supplied through the first feed point and the phase of the electric current supplied through the second feed point is 90 degrees.

12. The wireless communication device of claim 11, wherein each of the plurality of circular polarized receiving antennas adjusts a phase of an electric current supplied to the circular polarized receiving antenna through the third feed point, and adjusts a phase of an electric current supplied to the circular polarized receiving antenna through the fourth feed point by each of the plurality of second group of phase shifting units, a difference between the phase of the electric current supplied through the third feed point and the phase of the electric current supplied through the fourth feed point is 90 degrees.

13. The wireless communication device of claim 12, wherein the dielectric substrate comprises a first substrate and a second substrate, a surface of the first substrate away from the second substrate is arranged with the plurality of circular polarized transmitting antennas and the plurality of circular polarized receiving antennas, a surface of the second substrate away from the first substrate is arranged with a ground layer.

14. The wireless communication device of claim 10, wherein an area of the plurality of circular polarized transmitting antennas is smaller than an area of the plurality of circular polarized receiving antennas.

15. The wireless communication device of claim 10, wherein the plurality of circular polarized transmitting antennas comprises a plurality of rows of first circular polarized transmitting antennas and a plurality of rows of second circular polarized transmitting antennas; the plurality of circular polarized receiving antennas comprises a plurality of rows of first circular polarized receiving antennas and a plurality of rows of second circular polarized receiving antennas; the first circular polarized transmitting antennas in each row and the first circular polarized receiving antennas in each row are arranged in a first alternate arrangement, to form a first antenna array; the second circular polarized transmitting antennas in each row and the second circular polarized receiving antennas in each row are arranged in a second alternate arrangement, to form a second antenna array.

16. The wireless communication device of claim 15, wherein the first antenna array and the second antenna array are arranged on opposite ends of the dielectric substrate.

17. The wireless communication device of claim 15, wherein the first antenna array and the second antenna array radiate at least four working frequency bands.

18. The wireless communication device of claim 17, wherein the first antenna array radiates a first working frequency band and a second working frequency band, the second antenna array radiates a third working frequency band and a fourth working frequency band, the second working frequency band is smaller than the first working frequency band, the first working frequency band is smaller than the fourth working frequency band, and the fourth working frequency band is smaller than the third working frequency band.

* * * * *